Patented Dec. 30, 1941

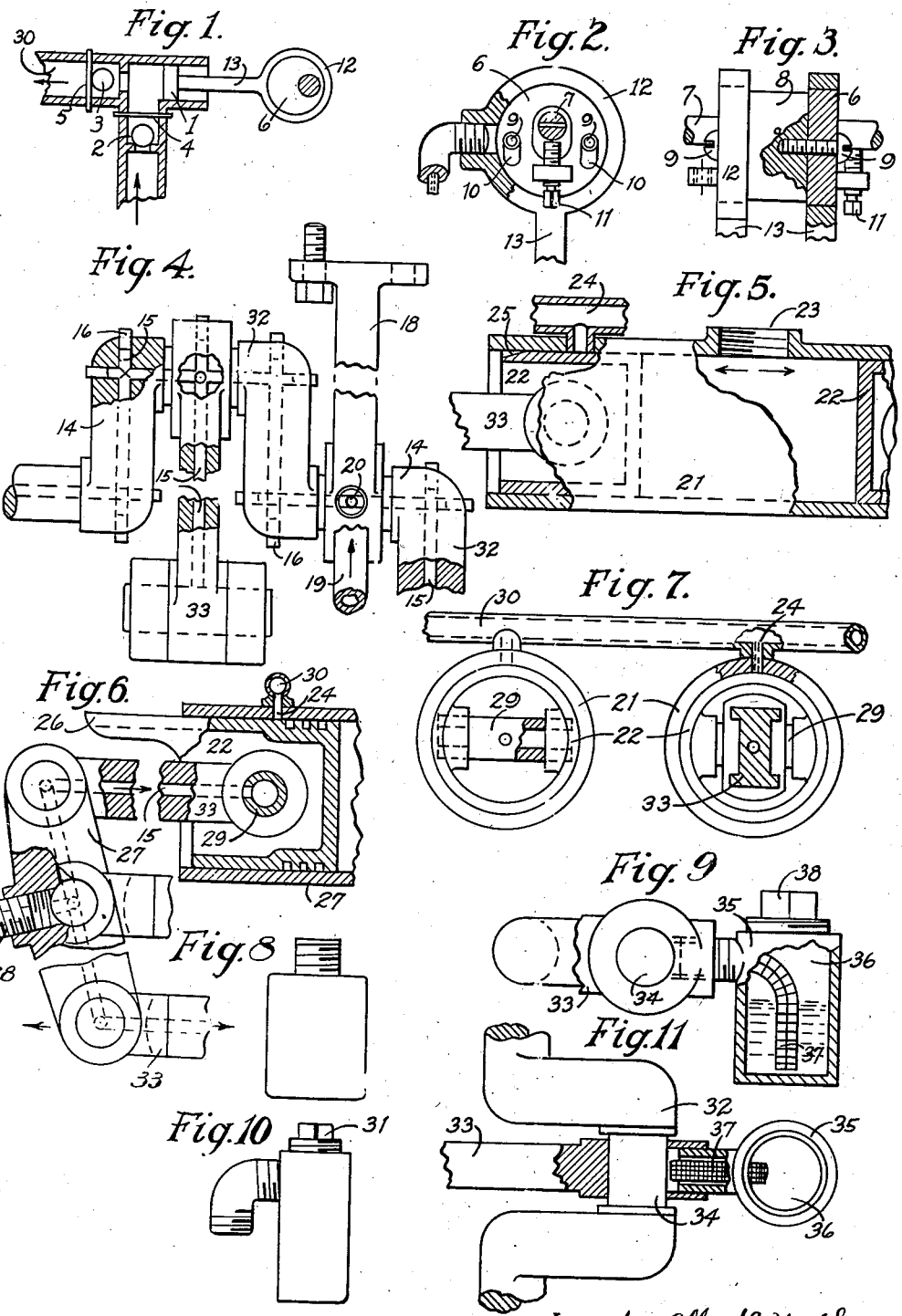

2,267,989

UNITED STATES PATENT OFFICE 2,267,989

INTERNAL COMBUSTION ENGINE

Alfred C. North, Elkhart, Ind.

Application January 12, 1938, Serial No. 184,523

2 Claims. (Cl. 184—18)

My invention relates to improvements in internal combustion engine lubrication and particularly to such an engine, having two opposed pistons in a cylinder, as disclosed and described in an application for a patent filed by myself February 26, 1937, Ser. No. 127,836.

While my invention may be used in and with any machine requiring oil and particularly internal combustion engines, it is practically indispensable to the type of engines having two opposed pistons in a cylinder as above mentioned.

The object, therefore, of my invention is to produce an heretofore unknown practical solution to the oiling of all types of internal combustion engines and particularly those engines provided with two opposed pistons in a cylinder.

I attain these objects by mechanisms as disclosed in the accompanying drawing and the following explanations, wherein, Fig. 1 shows a side segmental elevation of an oil force pump operated by an adjustable simple or multiple eccentric, mounted on a shaft as shown in Fig. 2. Fig. 3 is an end elevated section of Fig. 2. Fig. 4 is a general plan view of a section of a crankshaft with connections. Fig. 5 is a longitudinal elevated section of a cylinder and pistons. Fig. 6 is the same as Fig. 5 with elongated piston and connections. Fig. 7 shows vertical end views of cylinders, pistons and oil supply conduit. Fig. 8 is a commercial oil cup. Fig. 9 is an end section of a crank, crank connecting rod and a method of oiling. Fig. 10 is a view of a top oiling oil cup. Fig. 11 is a sectional plan view of Fig. 9.

Similar numerals refer to similar parts throughout the several views.

Fig. 1 is an ordinary force pump connected with an oil supply or tank in common use, with the usual piston 1, valves 2 and 3, stop pins 4 and 5, and connected to and operated by an adjustable eccentric 6, so that the oil stream may be controlled to meet the exact need where needed. The ideal here sought and believed accomplished is the delivery of a dustless, invisible, exact amount of oil as required. However, the pump shown and the means of operating said pump may be any other mechanisms than the ones herein considered. I prefer an eccentric throw of this type because of easy, accurate adjustment and small impulses, pumping possibly one to two drops per shaft revolution. 7 may be a cam shaft, 8 is a fixed hub pinned to said shaft and mounted on said hub are one, two or more eccentrics 6, adjustably fastened to said hub by screws 9, in slots 10. Adjusting screw 11 serves to fix eccentric 6, or another, as nearly concentric as desired which controls the throw of band 12 a part of connecting rod 13. Since some bearings require more oil than others, I prefer two, or even three, pumping units and where very little oil is needed, as at the cranks, I use oil cups.

But, in further explanation, in Fig. 4, 14 is a segment of a crankshaft with holes or conduits 15 plugged at 16 to secure a continuous oil stream leaking only at the various bearings for lubrication thereat. 33 is a typical connecting rod having a conduit and oiled in the same manner as said shaft. 18 is a hanger for a main bearing to the said crankshaft. Oil pipe 19 continued from the pump, Fig. 1, enters the fixed hanger at 20 supplying the desired amount of oil to the various bearings through the continued conduits.

Fig. 5 shows a segment of a cylinder 21, the two pistons 22, 22 and between them a spark plug opening 23. In this case where the pistons are too short to remain continuously under the oil hole 24, I slope the outer, upper end of the piston as at 25 to prevent scraping off and wasting oil. In Fig. 6 is shown my preferred method of forming the pistons as at 26. In this formation the piston top is continuously under the oil hole 24, just back or outside of the piston rings, the stroke being less than the distance from the rings to the end of the skirt. The oil is applied at the top of the piston flowing down and around the same as it should. Cutting away the skirt below, as shown, permits shorter cylinders and allows levers 27 to be much closer together for placing within a chassis. See application above mentioned.

Internal oiling may be accomplished by pumping oil through a connecting pipe into pipe or conduit 28 of the trunnion bearings of the lever 27 and thence through the indicated conduits 15 to the piston pins 29 and on to the cylinders and pistons as shown.

Fig. 7 is an end view of side view Fig. 6 showing my preferred manner of piston oiling. Since the pistons require much more oil and much more evenly spread than other parts, I attach pipes or tubes 30, with openings 24, across both ends of the cylinders just outside of the piston rings, when said pistons are farthest apart and place, if desired, porous matter, as felt, in said openings 24 or tubes 30 to insure an even flow of oil.

It will be understood the tubes 30 may be any length and with any number of openings as also cylinders 21 and pistons 22 may be any number. Figs. 8 and 10 may be a common means of bottom and top oil cup oiling with removable plug 31, for re-filling. Figs. 9 and 11 are two views, side and top, of my preferred method of oiling cranks and some other bearings. 32 is any crank, 33 is any connecting rod, 34 is any bearing and 35 an oil cup of special design, provided with a large oil reservoir 36, a pervious wick 37, and a re-filling plug 38, all clearly shown.

From what I have shown and described it should be clearly apparent that the pistons, all in the same horizontal plane, may be considered as one unit in the lubrication thereof with their pump delivering exactly what oil they need for free moving and no excess to burn or waste. Another pump herein provided may be used as another unit for a selected set of other heavy bearings with exterior tubes or pipes or interior conduits also herein provided. I prefer oil cups for the smaller bearings. Any one of the above methods may be used as a whole or in parts in oiling as desired; but, as said, I prefer to divide them into units requiring much the same quantities of oil and, as near as may be, on the same levels.

I am now claiming an oiling means and making the above-mentioned application a part of this application as the drawing and other matters therein more clearly explain the drawing and other matters herein.

I claim:

1. In an internal combustion engine, a cylinder, a piston therein, oil supply means extending through the cylinder wall, said piston being sufficiently long to cover the inlet of the oil supply means through the cylinder wall at any point in the piston stroke.

2. In the oiling of an internal combustion engine with each cylinder carrying two opposed hollow pistons, an oil supply conduit with inlets through the cylinder walls to lubricate said pistons, one side of each piston being sufficiently extended to cover the said inlet for that cylinder at any point in the piston stroke.

ALFRED C. NORTH.